Dec. 15, 1925.
D. H. GARDNER ET AL
1,566,084
AIR BRAKE DRAIN DEVICE
Filed Oct. 6, 1924
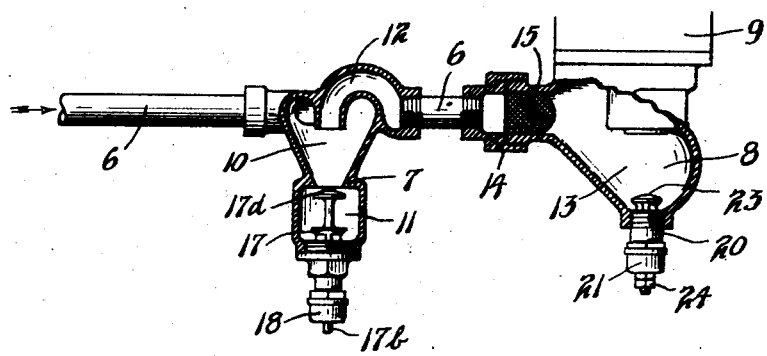
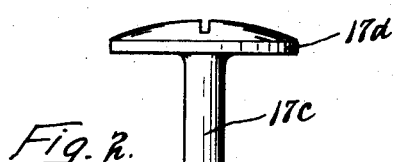
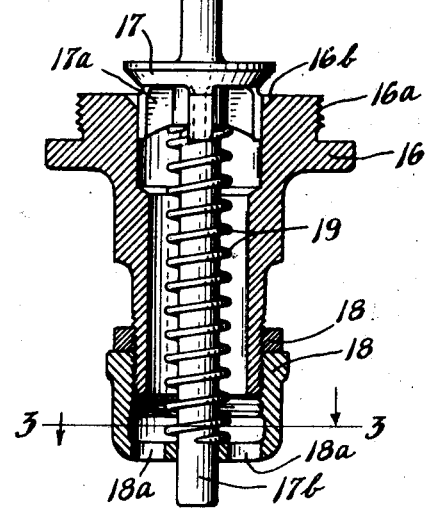
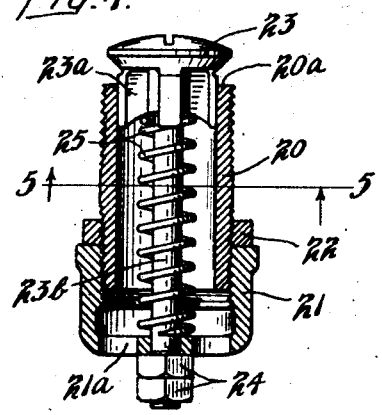
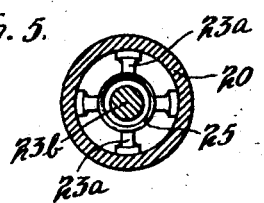
INVENTORS
DANIEL H. GARDNER
GEORGE BAKER
BY THEIR ATTORNEY
James F. Williams Patented Dec. 15, 1925.

1,566,084

UNITED STATES PATENT OFFICE.

DANIEL H. GARDNER AND GEORGE BAKER, OF MINNEAPOLIS, MINNESOTA.

AIR-BRAKE DRAIN DEVICE.

Application filed October 6, 1924. Serial No. 741,858.

*To all whom it may concern:*

Be it known that we, DANIEL H. GARDNER and GEORGE BAKER, citizens of the United States, residing at Minneapolis, in the county of Hennepin and State of Minnesota, have invented certain new and useful Improvements in an Air-Brake Drain Device; and we do hereby declare the following to be a full, clear, and exact description of the invention, such as will enable others skilled in the art to which it appertains to make and use the same.

This invention relates to an air brake apparatus, such as now commonly used on railway cars and particularly to means for cleaning the dirt, dust and moisture from certain chambers in such an apparatus. The air used in the ordinary air brake apparatus is pumped by an air pump mounted on the engine and considerable dust is pumped into the air tanks. This dust passes into the air conduits in the brake apparatus and is very apt to interfere with the proper working of some of the valves and of the delicate parts. Most air brake apparatus today, therefore, has a dust collector in the air line in advance of the triple valve mechanism and screens and other dust collecting devices are used. The dust collected by the dust collector is periodically removed and surprisingly large quantities of dust are taken from the apparatus. Owing to the fact that the apparatus must be sealed or air tight when in operation, any moisture which collects in the apparatus is retained therein. Considerable moisture or water sometimes collects in the apparatus and is often carried into the triple valve and other delicate parts. In cold weather this water freezes and interferes with the proper operation of the air brake. This has often resulted in the brakes being set and flat wheels produced thereby.

It is an object of this invention to provide a very simple and efficient means whereby any water collecting in the various chambers of the air brake apparatus may be removed and which will also function to expel dust collecting in such chambers.

It is also an object of the invention to provide a simple and efficient means in the dust collector used on the air brake apparatus and in other chambers thereof comprising a member having an opening to the atmosphere adapted to be closed by a movable member which is normally held in open position but which is adapted to close upon a certain air pressure being attained in said chambers whereby any moisture can be drained from the apparatus and whereby a jet or blast of air will pass through said opening before the same is closed by said member, the dust or dirt being expelled by said jet or blast of air.

These and other objects and advantages of the invention will be fully set forth in the following description made in connection with the accompanying drawings in which like reference characters refer to the same parts throughout the different views, and in which, Fig. 1 is a view partly in side elevation showing certain portions of an air brake apparatus, a part thereof being broken away and other parts being shown in vertical section;

Fig. 2 is a view in vertical section of a portion of the apparatus shown in Fig. 1;

Fig. 3 is a view in horizontal section on the line 3—3 of Fig. 2, as indicated by the arrow;

Fig. 4 is a vertical section through another portion of the apparatus shown in Fig. 1; and Fig. 5 is a view in horizontal section taken on the line 5—5 of Fig. 4, Figs. 2 to 5 being shown on an enlarged scale.

Referring to the drawings, a portion of an air brake apparatus such as now commonly used on railway trains is illustrated in which it will only be necessary to consider the air conduit 6 through which air passes when the apparatus is operated, the centrifugal dust collector 7 interposed in the air line 6 and the casing 8 constituting the bottom of the triple valve mechanism, a portion of which is shown as 9 above casing 8. The dust collector 7 is of the well known centrifugal or cyclone type comprising an inverted frusto-conical chamber 10 into which the conduit 6 tangentially discharges. Said chamber 10 has an opening at its lower end communicating with an enlarged chamber 11. The dust collector 7 has a passage 12 extending through a downwardly projecting spout or hub in the center of chamber 10 and communicating at the side of the device with the continuation of the conduit 6. The conduit 6 then is connected to the chamber 13 formed in casing 8 by means of a coupling 14 of any well known or standard type, a screen 15 being interposed between the conduit 6 and chamber 13. The parts thus far described are well known and standard parts of the railway air brakes now used. The air turned into the conduit 6 is tangentially projected into casing 10. A circular or cyclonic motion is given to the air and the dust therein is thrown out against the wall of said chamber and settles down to the bottom thereof and passes through the opening in said bottom. The air passes out of chamber 10 centrally at its top through the passage 12 and thence on through the conduit 6 through screen 15 and into the casing 8 from which it passes to the triple valve and operates the same.

In the ordinary dust collector used a stem rises from the bottom of casing 11 carrying an enlarged flat head with a slightly convex top surface similar to the stem and head shown in chamber 11 in Fig. 1. In the standard apparatus used, a plug is screwed into the bottom of the casing forming chamber 11 which is periodically removed to remove the dust from said chamber. An ordinary standard solid plug is also screwed into the bottom of casing 8.

In accordance with the present invention, the plug commonly used in chamber 11 is removed and the hollow plug or shell 16 inserted in its place. The plug 16 has a flange fitting against the bottom of the casing forming chamber 11 and a threaded portion $16^a$ adapted to be screwed in said casing. The plug 16 is provided with a central bore, the top of which forms a valve seat $16^b$ and a valve 17 is provided adapted to engage said seat and close said bore, said valve having spaced arms $17^a$ forming a guiding means therefor in said bore and having a depending central stem $17^b$. A stem $17^c$ extends upward from valve 17 and carries an enlarged flat top $17^d$ having a slightly convex top surface, which surface normally is disposed a short distance beneath the opening in the bottom of chamber 10. The lower end of plug or shell 16 is exteriorly threaded and receives an interiorly threaded cup 18 having a central opening receiving and guiding the stem $17^b$ and having a plurality of ports $18^a$ in its bottom, said ports opening to the atmosphere. A threaded collar $18^b$ is placed on shell 16 above the cup 18 adapted to hold the cup in various positions on said shell. A coiled compression spring 19 surrounds the stem $17^b$ bearing at its lower end on the bottom of cup 18 and at its upper end on the lower side of valve 17 or its guiding means $17^a$.

In operation, the spring 19 will be placed under such tension by adjustment of cup 18 and its collar $18^b$ that the valve 17 will normally occupy the position shown in Figs. 1 and 2. At this time, there is no air pressure in the conduit 6 or chamber 10. Any water finding its way into the apparatus will pass into the chamber 10 and run down into chamber 11, and hence, downward into cup 18 and will drain out through the ports $18^a$. Any dust separated by the member 7 will also pass, as usual, down into the chamber 11 and some or all of this dust will find its way down into the shell 16 and cup 18. When the air is turned into the air line 6 in the operation of the air brake apparatus, air pressure will be built up in chambers 10 and 11 and valve 17 will be forced down on its seat $16^b$ against the pressure of spring 19. This will close the passage or bore through shell 16 so that chamber 11 will be sealed, as usual, and the air will be retained therein. Just previous to the closing of valve 17 a jet or gust of air will rush beneath said valve through the bore in shell 16 and out through the ports $18^a$. This short rush of air will carry any dirt, dust or moisture in said ports out through the ports $18^a$. The valve 17 will remain closed as long as a certain air pressure is maintained in the apparatus. When this pressure again dies down, spring 19 will again open valve 17 and the apparatus will be ready for a new operation when the air is again turned on.

In Figs. 4 and 5, a form of the invention is shown adapted to be used in the casing 8 below the triple valve or in the supply tanks for the air apparatus, such as the locomotive tank. Such tanks, as above stated, usually have a drain plug threaded into the bottom thereof. In using the present invention, this plug is removed and replaced by a hollow shell 20. While any convenient size of shell may be used in actual practice, a shell of ¾ inch exterior diameter has been found to be suitable and the bosses already on the air tanks will accommodate such a shell. The shell 20 is exteriorly threaded at its lower portion to receive a cup 21 similar to the cup 18 already described, which cup 21 is held in adjusted position on said shell 20 by a threaded collar 22, and which cup has ports $21^a$ in the bottom thereof. The top of shell 20 is formed as a valve seat $20^a$ and a valve 23 is formed to co-operate with said seat, said valve having a guiding means $23^a$ therebeneath comprising spaced arms fitting in the bore or shell 20. The valve 23 also has a downwardly projecting stem $23^b$ guided in a central opening in the bottom of cup 21, which stem has its lower end threaded to receive a pair nuts 24, the lower of which forms a jam nut. A spring 25 surrounds stem $23^b$, bearing at its lower end against the bottom of cup 21 and at its upper end against the guiding means $23^a$. The valve 23 and member $17^d$ may be provided with slots in their top surfaces, as shown in Figs. 2 and 4 to receive a turning instrument when it is desired to grind the valves 17 and 23.

In operation, the valve 23 will normally be held in open position by spring 25, as shown in Figs. 1 and 4, the nuts 24 limiting its upward movement. At this time there is no air pressure in the chamber 13. When the air is turned into said chamber to operate the apparatus, air pressure will be built up in chamber 13 and the valve 23 will be forced down to its seat 20ᵉ against the pressure of spring 25, thus closing and sealing the chamber 13 so that the air will be retained therein. Just before the valve 23 closes, air will rush around the sides thereof and through the shell 20 and out through the ports 21ᵃ. The rush of air will carry the dust collected in the bottom of chamber 13 or in parts 20 and 21ᶜ through the ports 21ᵃ. Any water of moisture collected in the chamber 13 of cup 21 will, of course, drain through the ports 21ᵃ. When the pressure again dies down in chamber 13 the spring 25 will lift the valve 23 and the parts will then be in position for another operation when the air is again turned on.

From the above description it is seen that applicant has provided a very simple and efficient means for cleaning the apparatus of moisture, water, dust and dirt. When the air is turned into the apparatus, as described, the dust is quickly blown out and a cloud of dust is seen to issue through the ports into cups 18 and 21. Any water or moisture also either drains out of the ports or is blown out when the air is turned on and the water therefore does not collect and freeze in the apparatus causing improper operation thereof and of the brakes. The device is, as stated, quite simple and can be applied to standard apparatus without any change being made therein. The device has been actually demonstrated in actual practice on a railway train and found to be very successful and efficient.

It will, of course, be understood, that various changes may be made in the form, details, arrangement and proportions of the parts without departing from the scope of applicants' invention, which, generally stated, consists in a device capable of carrying out the objects above set forth and the novel parts and combinations shown and described and defined in the appended claims.

What is claimed is:

1. The combination with a chamber adapted to receive air under pressure, said chamber having an opening in its bottom, a casing secured in said opening having a passage therethrough with a valve seat formed therein, a valve disposed above said casing having a stem passing through said passage, an open bottom member threaded on the bottom of said casing through which said stem projects, a spring surrounding said stem between said last mentioned member and valve, and means limiting the upward movement of said valve whereby the tension of said spring can be varied.

2. The combination with a dust collector of an air brake apparatus having an inverted conical chamber with an opening in its bottom and an enlarged dust collecting chamber below said opening, said latter chamber having an opening in its bottom, a casing secured in said opening having a passage therethrough opening at the bottom of said casing, said casing having a valve seat formed therein, a valve adapted to cooperate with said seat and having a stem extending through said passage, a spring in said casing normally holding said valve elevated, a stem rising from said valve carrying an enlarged head at its upper end, said head normally being spaced below said first mentioned opening but adapted to close said opening when said spring is sufficiently tensioned, said head and valve being adapted to be depressed and said valve closed when air under pressure enters said inverted conical chamber.

In testimony whereof we affix our signatures.

DANIEL H. GARDNER.
GEORGE BAKER.